Figure 1:
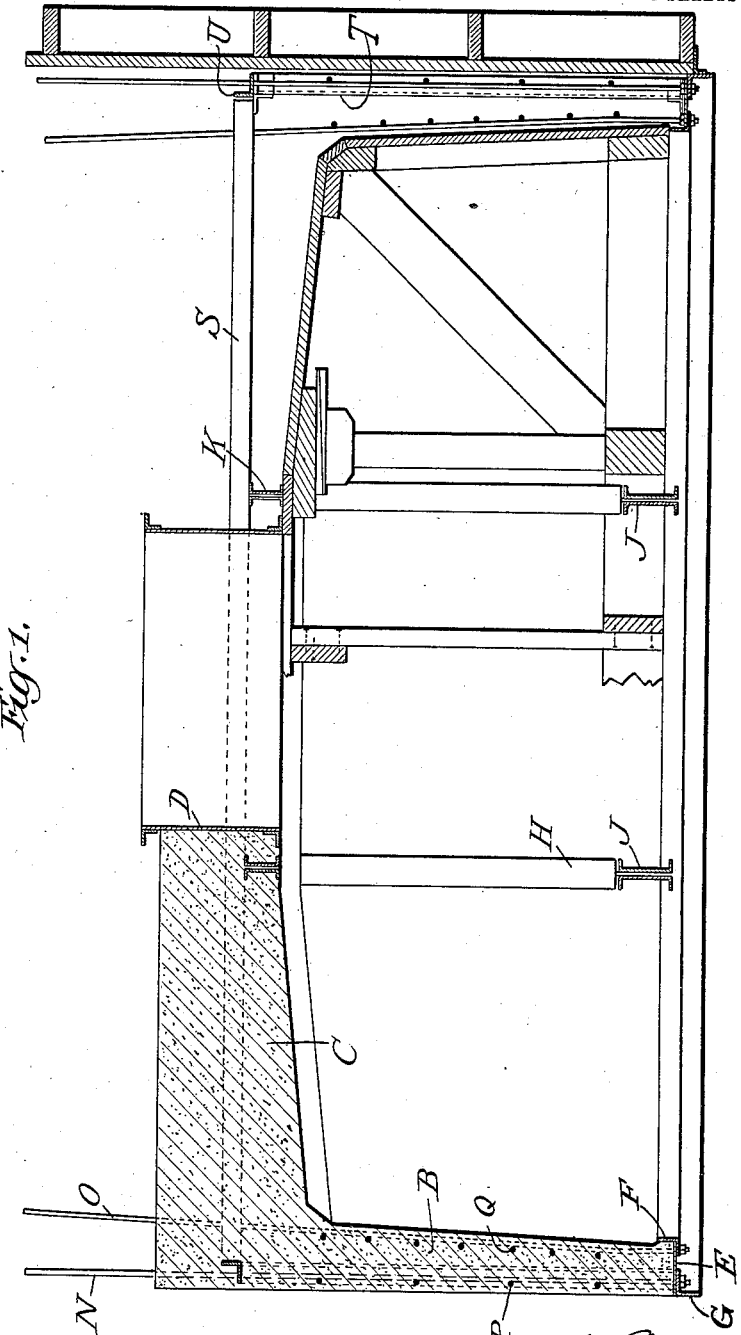

R. H. CHAMBERS.
CAISSON.
APPLICATION FILED DEC. 21, 1911.

1,026,656.

Patented May 21, 1912.
4 SHEETS—SHEET 1.

WITNESSES

INVENTOR
Ralph H. Chambers
BY
ATTORNEY

R. H. CHAMBERS.
CAISSON.
APPLICATION FILED DEC. 21, 1911.
1,026,656.
Patented May 21, 1912.
4 SHEETS—SHEET 2.
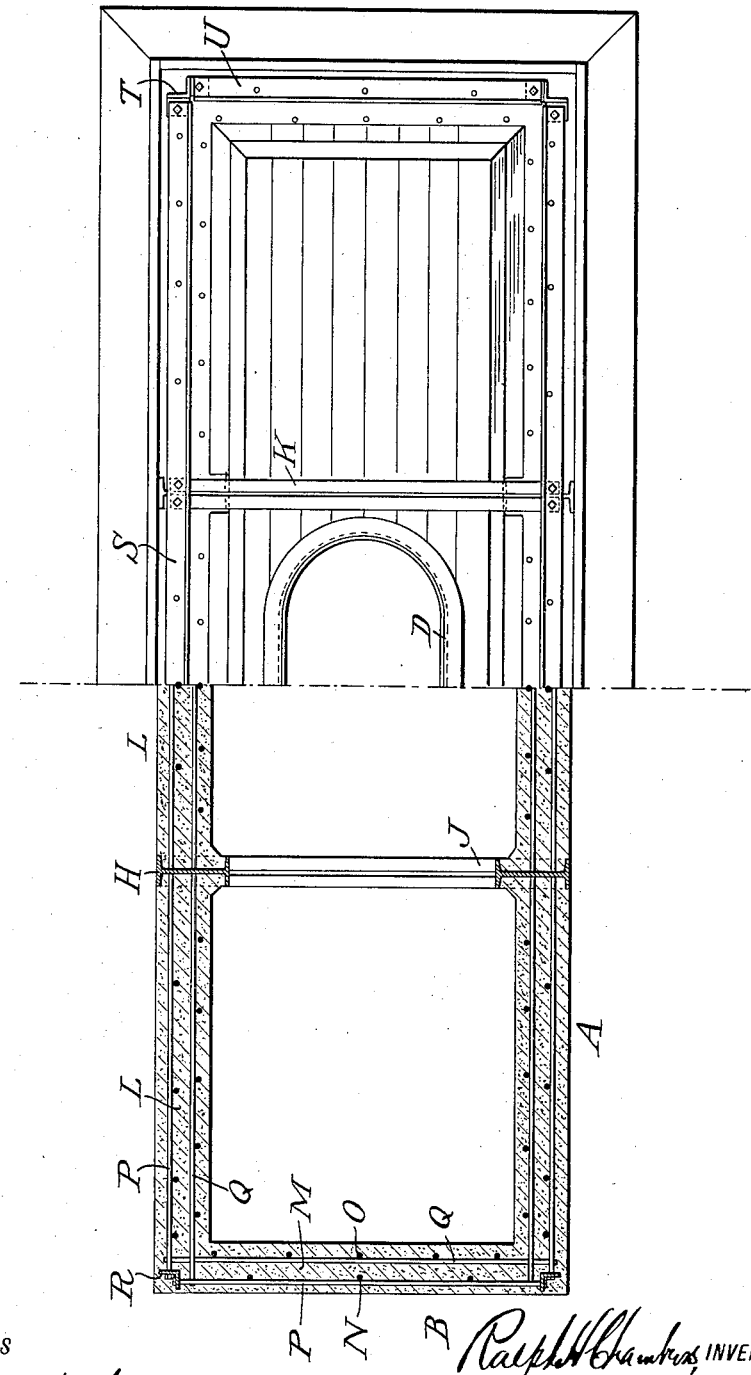

R. H. CHAMBERS.
CAISSON.
APPLICATION FILED DEC. 21, 1911.
1,026,656.
Patented May 21, 1912.
4 SHEETS—SHEET 3.
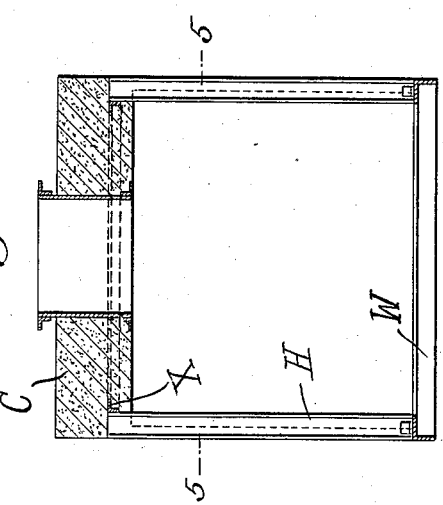
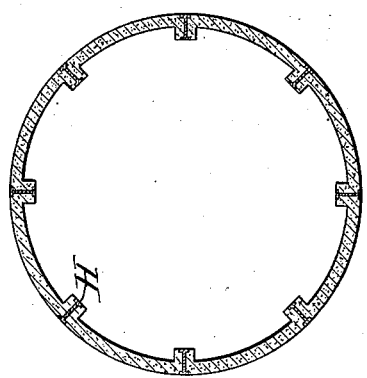
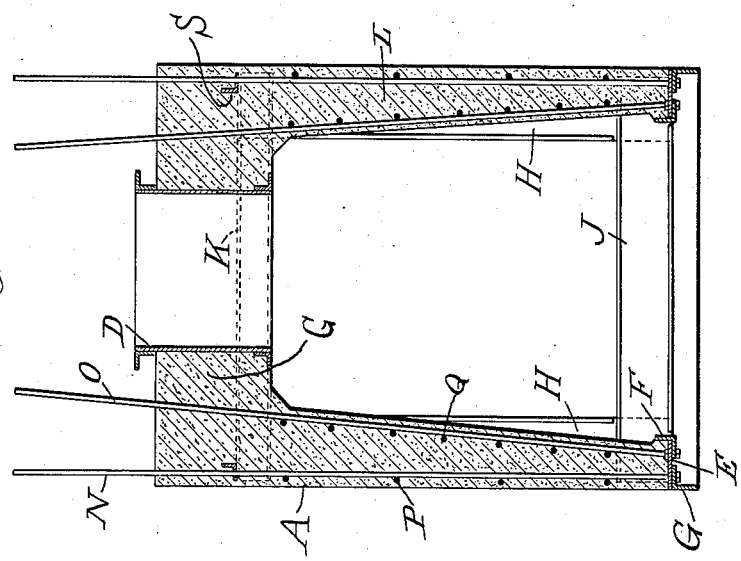

R. H. CHAMBERS.
CAISSON.
APPLICATION FILED DEC. 21, 1911.
1,026,656.
Patented May 21, 1912.
4 SHEETS—SHEET 4.
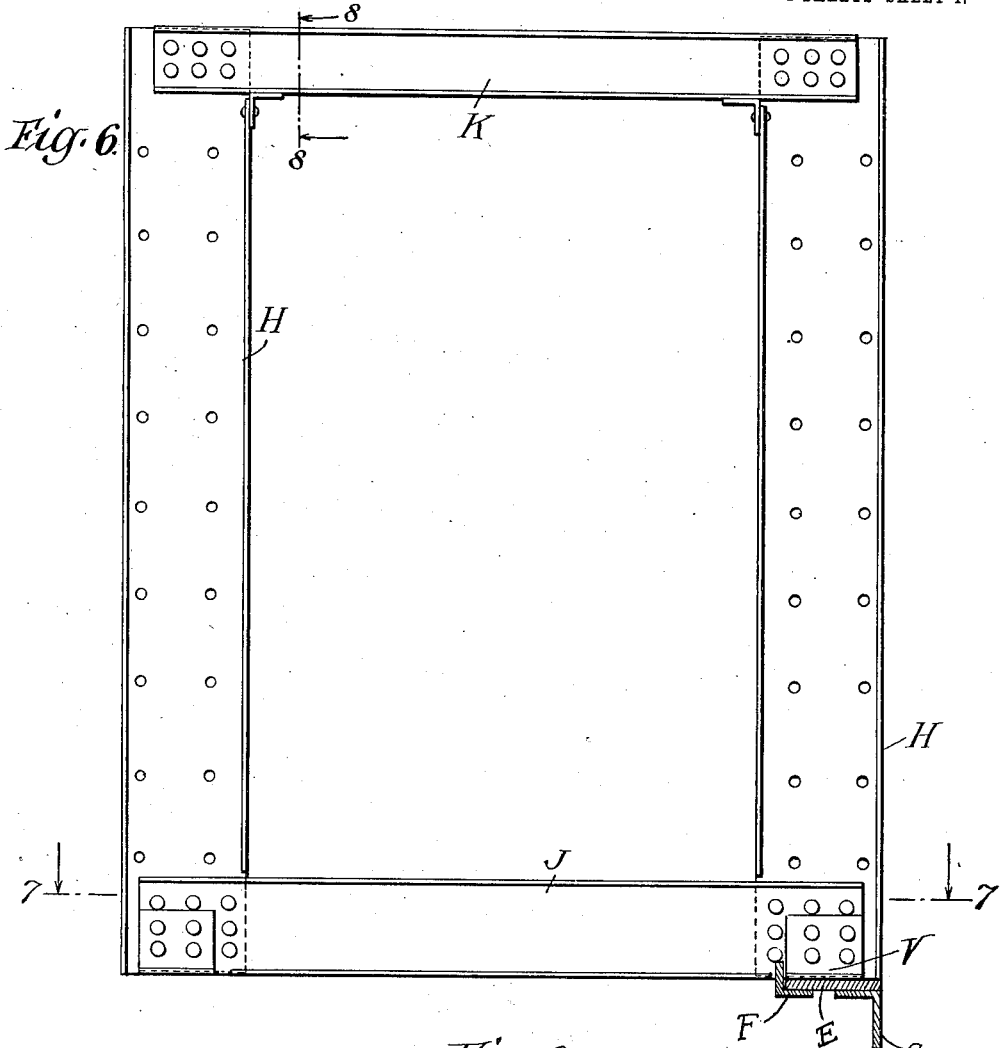
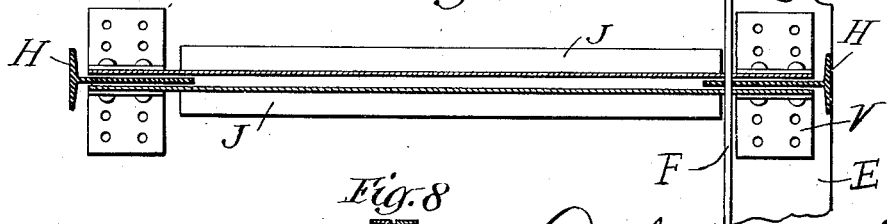
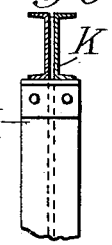

UNITED STATES PATENT OFFICE.

RALPH H. CHAMBERS, OF NEW YORK, N. Y., ASSIGNOR TO THE FOUNDATION COMPANY, A CORPORATION OF NEW YORK.

CAISSON.

1,026,656.  Specification of Letters Patent.  Patented May 21, 1912.

Application filed December 21, 1911. Serial No. 667,178.

*To all whom it may concern:*

Be it known that I, RALPH H. CHAMBERS, a citizen of the United States, residing in the city, county, and State of New York, have invented new and useful Improvements in Caissons, of which the following is a specification.

The invention aims to provide certain improvements in caissons, and especially (though not exclusively) pneumatic caissons used in forming foundation piers for high buildings. Such caissons have in some cases, generally under the outer wall of the building, to be made long and as narrow as possible. The minimum width is limited by the necessity of providing adequate width in the working chamber for workmen, buckets and so forth; and where the walls are of concrete they have been made so thick as to make both the excavation and the finished pier unnecessarily wide (involving a material expense) and to reduce the area within the line of piers which is available for cellars. With the aid of this invention such walls can be made much thinner than heretofore with a consequent saving in cost and increase in the available area within the line of piers. For this purpose the long side wall is stiffened by members extending vertically (that is, from top to bottom, whether truly vertical or otherwise) the spaces between such members or between one of said members and the end of the wall being filled with concrete. The stiffening members are preferably of non-plastic material, such for example as steel I-beams or other webbed and flanged shapes, and may extend inward beyond the inner face of the ordinary concrete portions of the wall, since these stiffening members are not very wide nor very close together and so do not interfere seriously with the work being done in the chamber. The stiffening members may be designed to withstand the entire inward pressure on the wall, but this is not essential. The intermediate concrete portions, even though made quite thin, will contribute a material measure of stiffness to the complete wall.

Other features of improvement are referred to hereinafter.

The accompanying drawings illustrate embodiments of the invention.

Figure 1 is partly a longitudinal vertical section of a completed working chamber and partly a similar view of the stiffening members, reinforcing rods and outside mold. Fig. 2 is partly a horizontal section of the completed working chamber and partly a plan view of the outer and inner molds with the stiffening members and reinforcing rods in place. Fig. 3 is a transverse vertical section of a completed working chamber. Figs. 4 and 5 are respectively a vertical and a horizontal section of a circular caisson. Figs. 6, 7 and 8 are respectively an elevation of a stiffening frame and sections on the lines 7—7 and 8—8 of Fig. 6.

Referring to the embodiment of the invention illustrated, the long sides A and the short ends B support a roof C and form the working chamber. A shaft or passage through the roof is provided by means of a lining D around which the roof is molded. The roof and the sides and ends are formed chiefly of concrete molded in place. A variety of contours of the inner faces of the chamber is possible and a variety of constructions of the mold. Figs. 1 and 2 (the right hand portions) show an inside mold which forms the under face of the roof sloping toward the ends and toward the sides; and shows the inner faces of the side and end walls tapering toward the lower edge where they are reduced to the width of the cutting edge which comprises a plate E, an inner angle F for reinforcing the concrete edge and an outer angle G projecting downward. The outer mold extends directly vertical. Between the two molds are located at suitable intervals vertically extending members H, I-beams in the case illustrated, the lower ends of which rest upon the cutting edge and are connected by transverse braces consisting of channels J extending across the lower part of the working chamber. The upper ends of the I-beams H are also tied together by a pair of channels K. These parts, H, J and K, therefore, form a self-contained structure of great strength to resist the lateral pressures encountered, without transmitting such pressures to the cutting edge or other part of the caisson. The design and framing of these parts is shown in detail in Figs. 6, 7 and 8. There are two such frames in the construction shown in Figs. 1 and 2, which may for example represent a caisson about 18 feet long and 6 feet 10 inches wide, measuring from the outer faces. For other dimensions of the caisson the stiffening members or structures may be differently designed and may be increased or diminished in number according to the depth to which the caisson is to be sunk and other circumstances. The roof is of solid concrete and is considerably stiffened by the channels K embedded therein. The chief (in volume) part of the side and end walls is composed of concrete forming what may be called short walls extending between adjacent stiffening members H and between such members and the end walls, these bodies of concrete being indicated for the sides and ends respectively by the letters L and M. Embedded in these concrete walls L and M are vertical reinforcing rods, N extending near the outer faces, and O extending near the inner faces; and two sets of horizontal rods P and Q adjacent respectively to the vertical rods N and O. The horizontal outer rods P are connected at the corners by means of vertical angles R. The upper corners of the stiffening frames H, J, K are connected by means of longitudinal angles S which extend substantially the full length of the caisson, these being connected at their ends to vertical angles T which in turn are connected to transverse angles U extending near the outer faces of the ends of the chamber. The vertical corner angles T are connected at their lower ends to the cutting edge. This frame of angle irons S, T, U not only holds the stiffening frames in place, but also stiffens the concrete at the ends and between the frames. The concrete side portions L extend at their ends within the flanges of the I-beams H. Thus the transverse strains which come on the concrete wall are transmitted to the stiffening frames which are made of ample strength to carry the strains. The connection between the concrete and the stiffening members H is made more positive by passing the horizontal rods P and Q through the webs of the members H, the latter being perforated for the purpose. The I-beams H may be of such size (see Figs. 2 and 3) that when their outer faces are flush with the outer faces of the concrete their inner faces project beyond the inner faces of the concrete, or beyond the lower part of such face where the latter is tapered as in Fig. 3. Thus a very thin wall of concrete may be used. The stiffening members H and the connecting members J are located at considerable intervals apart along the length of the caissons, so that their projection into the working chamber does not materially interfere with the work.

The frames H, J, K rest upon the cutting edge E, F, G as shown in Fig. 6 and are fastened thereto by means of short angles V, Figs. 6 and 7. Thus while the frames are self-contained and, therefore, do not transmit any strain to the cutting edge, the transverse members J serve to brace the cutting edge at one or more points in its length so as to add considerably to the strength of the cutting edge and of the side walls of the caissons even without the stiffness which is contributed by the vertical members H. Likewise, the stiffening members H are of considerable value, even without the transverse braces J, in making it possible to use a thinner wall than would otherwise be safe.

Figs. 4 and 5 show a circular caisson, the shape of which avoids the necessity of transverse braces since there are no long straight walls. In this case the cutting edge W is connected directly to the vertical stiffening members H, and the upper ends of the stiffening members are connected by a ring X of angular cross section. The cutting edge W and the member X practically serve the same purposes as the transverse braces J and K of the previous figures, taking into consideration the circular nature of the structure.

Though I have described with great particularity of detail certain specific embodiments of my invention, yet it is not to be understood therefrom that the invention is restricted to the particular embodiments disclosed. Various modifications thereof in details and in the arrangement of the parts may be made by those skilled in the art without departure from the invention.

What I claim is:

1. A caisson the sides of which are formed chiefly of concrete and comprise vertical I-beams with their webs extending transversely and the flanges engaged by the concrete to receive the transverse pressure thereof, a cutting edge extending around the lower edge of the caisson and means independent of said cutting edge for bracing the lower ends of said I-beams.

2. A caisson the sides of which are formed chiefly of concrete and comprise vertical I-beams with their webs extending transversely and the flanges engaged by the concrete to receive the transverse pressure thereof, and braces extending directly across the caisson between the lower ends of said I-beams.

3. A caisson the sides of which are formed chiefly of concrete and comprise vertical I-beams with their webs extending transversely and the flanges engaged by the concrete to receive the transverse pressure thereof, a concrete roof and braces between the upper ends of said I-beams and embedded in said roof.

4. A pneumatic caisson having a working chamber with a roof, long side walls and short end walls, said roof and walls being chiefly of concrete, said long side walls being stiffened at considerably separated intervals in their length by stiff vertically extending metal members embedded in the concrete and extending from the roof to the cutting edge of said side walls, and transverse braces extending across the lower part of the chamber and connecting the lower ends of said vertically extending members so as to resist the lateral pressures on the lower ends of said members without transmitting such pressures to the cutting edge.

5. A pneumatic caisson having a working chamber with a roof, long side walls and short end walls, said roof and walls being chiefly of concrete, said long side walls being stiffened at considerably separated intervals in their length by stiff vertically extending metal members embedded in the concrete and extending from the roof to the cutting edge of said side walls, the width of said members being at least substantially as great as that of the concrete so as to secure the maximum stiffness and to permit the separation of said members by considerable intervals, as aforesaid.

6. A pneumatic caisson having a working chamber with a roof, long side walls and short end walls, said roof and walls being chiefly of concrete, said long side walls being stiffened at considerably separated intervals in their length by stiff vertically extending metal members embedded in the concrete and extending from the roof to the cutting edge of said side walls, said members extending in width partially into the chamber so as to secure the maximum stiffness and to permit the separation of said members by considerable intervals, as aforesaid.

7. A pneumatic caisson having a working chamber with a roof, long side walls and short end walls, said roof and walls being chiefly of concrete, said long side walls being stiffened at considerably separated intervals in their length by stiff vertically extending metal members embedded in the concrete and extending from the roof to the cutting edge of said side walls, the width of said members being at least substantially as great as that of the concrete so as to secure the maximum stiffness and to permit the separation of said members by considerable intervals, as aforesaid, and transverse braces extending across the lower part of the chamber and connecting the lower ends of the vertically extending stiffening members.

8. A pneumatic caisson having a working chamber with a roof, long side walls and short end walls, said roof and walls being chiefly of concrete, said long side walls being stiffened at considerably separated intervals in their length by stiff vertically extending metal members embedded in the concrete and extending from the roof to the cutting edge of said side walls, the width of said members being at least substantially as great as that of the concrete so as to secure the maximum stiffness and to permit the separation of said members by considerable intervals, as aforesaid, and transverse braces embedded in said roof and connecting the upper ends of the vertically extending stiffening members.

9. A pneumatic caisson having a working chamber with a roof, long side walls and short end walls, said roof and walls being chiefly of concrete, said long side walls being stiffened at considerably separated intervals in their length by stiff vertically extending metal members embedded in the concrete and extending from the roof to the cutting edge of said side walls, transverse braces connecting the lower and upper ends respectively of said vertically extending members, so as to form self-contained transverse stiffening frames of approximately sufficient strength to resist the lateral pressures encountered without transmitting them to the cutting edge.

10. A pneumatic caisson having a working chamber with a roof, long side walls and short end walls, said roof and walls being chiefly of concrete, said long side walls being stiffened at considerably separated intervals in their length by stiff vertically extending metal members embedded in the concrete and extending from the roof to the cutting edge of said side walls, transverse braces connecting the lower and upper ends respectively of said vertically extending members, so as to form self-contained transverse stiffening frames of approximately sufficient strength to resist the lateral pressures encountered without transmitting them to the cutting edge, and longitudinal braces embedded in the concrete and connecting the upper ends of said frames to each other.

In witness whereof, I have hereunto signed my name in the presence of two subscribing witnesses.

RALPH H. CHAMBERS.

Witnesses:
   D. ANTHONY USINA,
   LULU STUBENVOLL.

Copies of this patent may be obtained for five cents each, by addressing the "Commissioner of Patents, Washington, D. C."